US005845398A

United States Patent [19]

Maumus et al.

[11] Patent Number: 5,845,398

[45] Date of Patent: Dec. 8, 1998

[54] TURBINE OF THERMOSTRUCTURAL COMPOSITE MATERIAL, IN PARTICULAR A TURBINE OF LARGE DIAMETER, AND A METHOD OF MANUFACTURING IT

[75] Inventors: Jean-Pierre Maumus, Cenon; Guy Martin, St.Aubin du Medoc, both of France

[73] Assignee: Societe Europeenne de Propulsion, Suresnes, France

[21] Appl. No.: 696,362

[22] Filed: Aug. 13, 1996

[30] Foreign Application Priority Data

Aug. 30, 1995 [FR] France .................................. 95 10206

[51] Int. Cl.$^6$ ...................................................... B23P 15/00

[52] U.S. Cl. ........................................ 29/889.21; 29/889.2

[58] Field of Search .............................. 29/889.2, 889.23, 29/889.21, 889.71, 428; 416/241 R

[56] References Cited

U.S. PATENT DOCUMENTS

| | | | |
|---|---|---|---|
| 4,186,473 | 2/1980 | Cross et al. | 29/889.2 |
| 4,709,457 | 12/1987 | Broquerc et al. | 29/889.2 |
| 5,205,709 | 4/1993 | Schimel | 29/889.2 |

FOREIGN PATENT DOCUMENTS

| | | |
|---|---|---|
| 392496 | 2/1908 | France . |
| 2504209 | 10/1982 | France . |
| 2584106 | 1/1987 | France . |
| 2686907 | 8/1993 | France . |
| 846071 | 8/1960 | United Kingdom . |

*Primary Examiner*—Irene Cuda
*Attorney, Agent, or Firm*—Weingarten, Schurgin, Gagnebin & Hayes LLp

[57] ABSTRACT

The turbine comprises a plurality of blades disposed around a hub between two end plates, with the blades, the hub, and the end plates being made of thermostructural composite material. The hub is made by stacking plane annular plates of thermostructural composite material along a common axis. Each blade is made individually by shaping a two-dimensional fiber fabric in plate or sheet form to obtain a blade preform, by densifying the preform with a matrix to obtain a blade blank made of thermostructural composite material, and by machining an outline for the densified preform. Each end plate is obtained by making an annular preform by means of a two-dimensional fiber fabric in plate or sheet form, and by densifying the preform with a matrix to obtain a part made of thermostructural composite material. The blades are assembled to the hub between the end plates, with each blade being connected to the hub by a portion forming a blade root.

8 Claims, 3 Drawing Sheets

TURBINE OF THERMOSTRUCTURAL COMPOSITE MATERIAL, IN PARTICULAR A TURBINE OF LARGE DIAMETER, AND A METHOD OF MANUFACTURING IT

The present invention relates to turbines, and more particularly turbines designed to operate at high temperatures, typically greater than 1000° C.

BACKGROUND OF THE INVENTION

One field of application for such turbines is stirring gases or ventilation in ovens or similar installations used for performing physico-chemical treatments at high temperatures, the ambient medium being constituted, for example, by inert or non-reactive gases.

Usually, such turbines are made of metal, generally being built up of a plurality of elements assembled together by welding. The use of metal gives rise to several drawbacks. Thus, the high mass of the rotary parts requires large shaft lines and very powerful motors, and in any event sets a limit on speed of rotation. There is also a temperature limit because of the risk of the metal creeping.

In addition, the sensitivity of metal to thermal shock can give rise to cracks forming or to deformation. This unbalances the rotary mass, leading to a reduction in the lifetime of turbines and of their drive motors. Unfortunately, in the applications mentioned above, severe thermal shock may occur, particularly when massively injecting a cold gas in order to lower the temperature inside an oven quickly for the purpose of reducing the duration of treatment cycles.

In order to avoid the problems encountered with metals, other materials have already been proposed for making turbines, in particular thermostructural composite materials. These materials are generally constituted by a fiber reinforcing fabric, or "preform", which is densified by a matrix, and they are characterized by mechanical properties that make them suitable for constituting structural elements and by their capacity for conserving such properties up to high temperatures. For example, usual thermostructural composite materials are carbon-carbon (C—C) composites constituted by carbon fiber reinforcement and a carbon matrix, and ceramic matrix composites (CMCs) constituted by carbon or ceramic fiber reinforcements and a ceramic matrix.

Compared with metals, thermostructural composite materials have the essential advantages of much lower density and of much greater stability at high temperatures. The reduction in mass and the elimination of any risk of creep can make it possible to operate at high speeds of rotation, and thus at very high ventilation flow rates without requiring overdimensioned drive members. In addition, thermostructural composite materials present very great resistance to thermal shock.

Thermostructural composite materials therefore present considerable advantages with respect to performance, but use thereof is restricted because of their rather high cost. Other than the cost of the materials used, the cost comes essentially from the duration of densification cycles, and from the difficulties encountered in making fiber preforms, particularly when the parts to be manufactured are complex in shape, as is the case for turbines.

OBJECTS AND SUMMARY OF THE INVENTION

Thus, an object of the present invention is to propose a turbine architecture that is particularly adapted to being made out of thermostructural composite material so as to be able to benefit from the advantages of such material but with a manufacturing cost that is as low as possible.

Another object of the present invention is to propose a turbine architecture that is suitable for making turbines of large dimensions, i.e. in which the diameter can be considerably greater than 1 meter (m).

In one of its aspects, the present invention provides a method of manufacturing a turbine comprising a plurality of blades disposed around a hub and between two end plates, the blades, the hub, and the end plates being made of thermostructural composite material, wherein:

a) the hub is made by stacking plane annular plates of thermostructural composite material along a common axis, and fastening the plates so that they are constrained to rotate together about the axis;

b) each blade is made individually by implementing the following steps:
   - an essentially two-dimensional fiber fabric in plate or sheet form is shaped to obtain a blade preform;
   - the preform is densified with a matrix to obtain a blade blank made of thermostructural composite material; and
   - the outline of the densified preform is machined;

c) each end plate is made by implementing the following steps:
   - an annular or substantially annular preform is made by means of an essentially two-dimensional fiber fabric in plate or sheet form; and
   - the preform is densified with a matrix to obtain a part made of thermostructural composite material; and d) the blades are assembled to the hub between the end plates, each blade being connected to the hub by a portion forming a blade root.

Thus, the essential portions of the turbine are made by assembling together parts that are simple in shape, e.g. plane annular plates constituting the hub, or parts made from fiber preforms of simple shape (two-dimensional sheet or plate), e.g. the blades and the end plates.

This avoids the difficulties that are encountered in fabricating and densifying preforms that are of complex shape, or the losses of material that are occasioned by machining parts of complex shape out of solid blocks of thermostructural composite material.

Each blade can be connected to the hub by inserting the root of the blade in a groove of complementary shape formed in the hub. According to a special feature of the method, the root of the blade is formed by installing an insert in a slit formed in the fiber fabric used for making the preform of a blade.

According to another feature of the method, the plates constituting the hub are assembled together with at least one annular plate constituting a first end plate that closes the passages between the blades at one end of the turbine, by being clamped axially on a shaft on which the turbine is mounted.

The second end plate co-operates with the hub to leave an annular fluid entry zone for suction through the passages between the blades and it is mounted on the blades, e.g. by engaging lugs formed on the adjacent edges of the blades in notches formed in the end plate, and/or by adhesive. In a variant, the second end plate may be static.

In another aspect, the invention provides a turbine made of thermostructural composite material and comprising a plurality of blades disposed around a hub between two end plates, the turbine comprising plane annular plates of thermostructural composite material stacked along a common axis and fastened to one another so as to be constrained to rotate together about the axis, thereby forming a hub, and blades of thermo-structural composite material are individually connected to the hub by respective portions forming blade roots.

Advantageously, said plane annular plates of thermo-structural composite material form an assembly comprising the hub and a first end plate which closes the passages between the blades at one end of the turbine.

BRIEF DESCRIPTION OF THE DRAWINGS

Other features and advantages of the invention appear on reading the following description given by way of non-limiting indication and with reference to the accompanying drawings, in which.

MORE DETAILED DESCRIPTION

Figure 1:
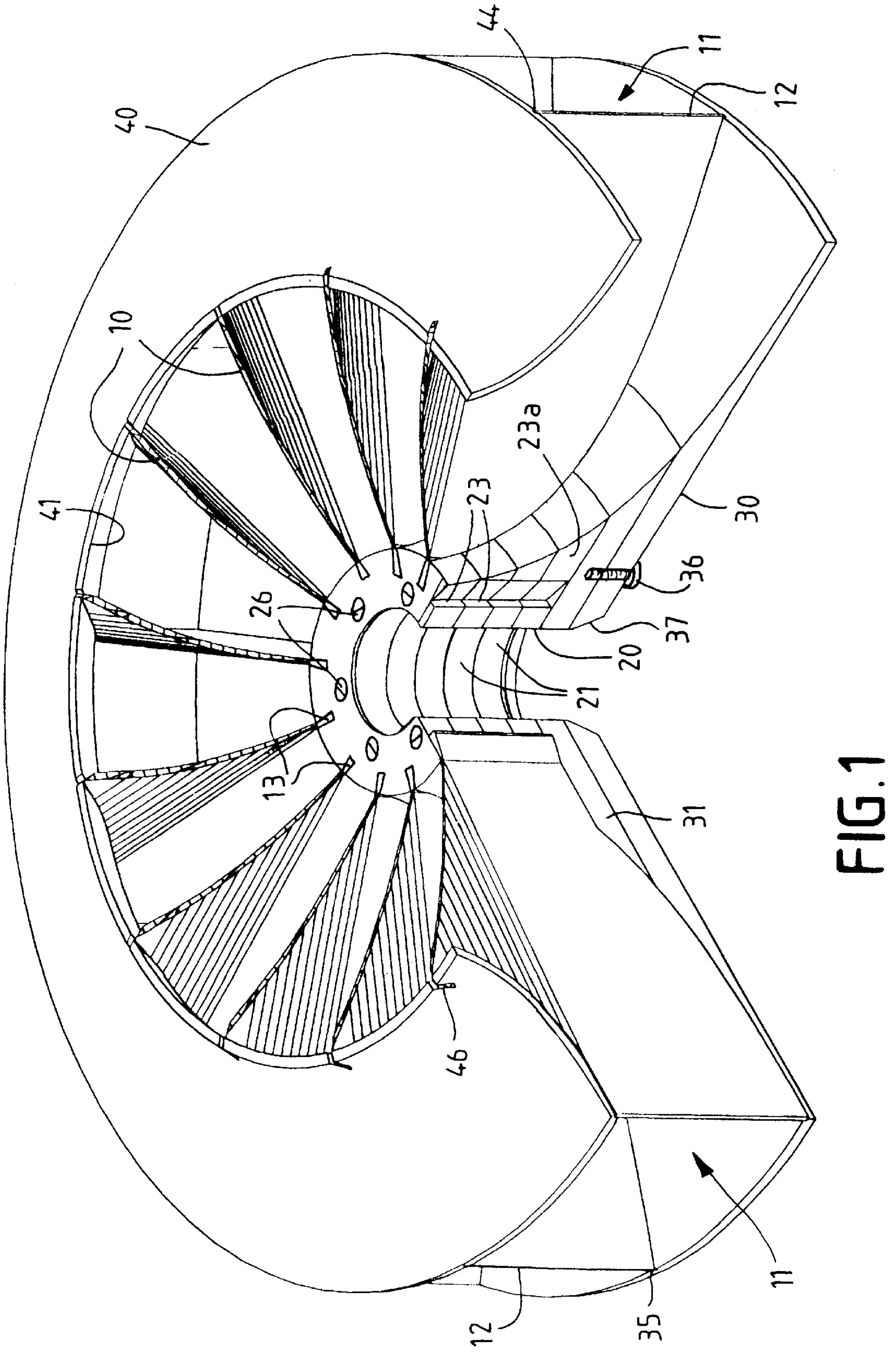
FIG. 1 is a partially cutaway perspective view showing a turbine of the invention assembled together and mounted on a shaft.
Figure 2:
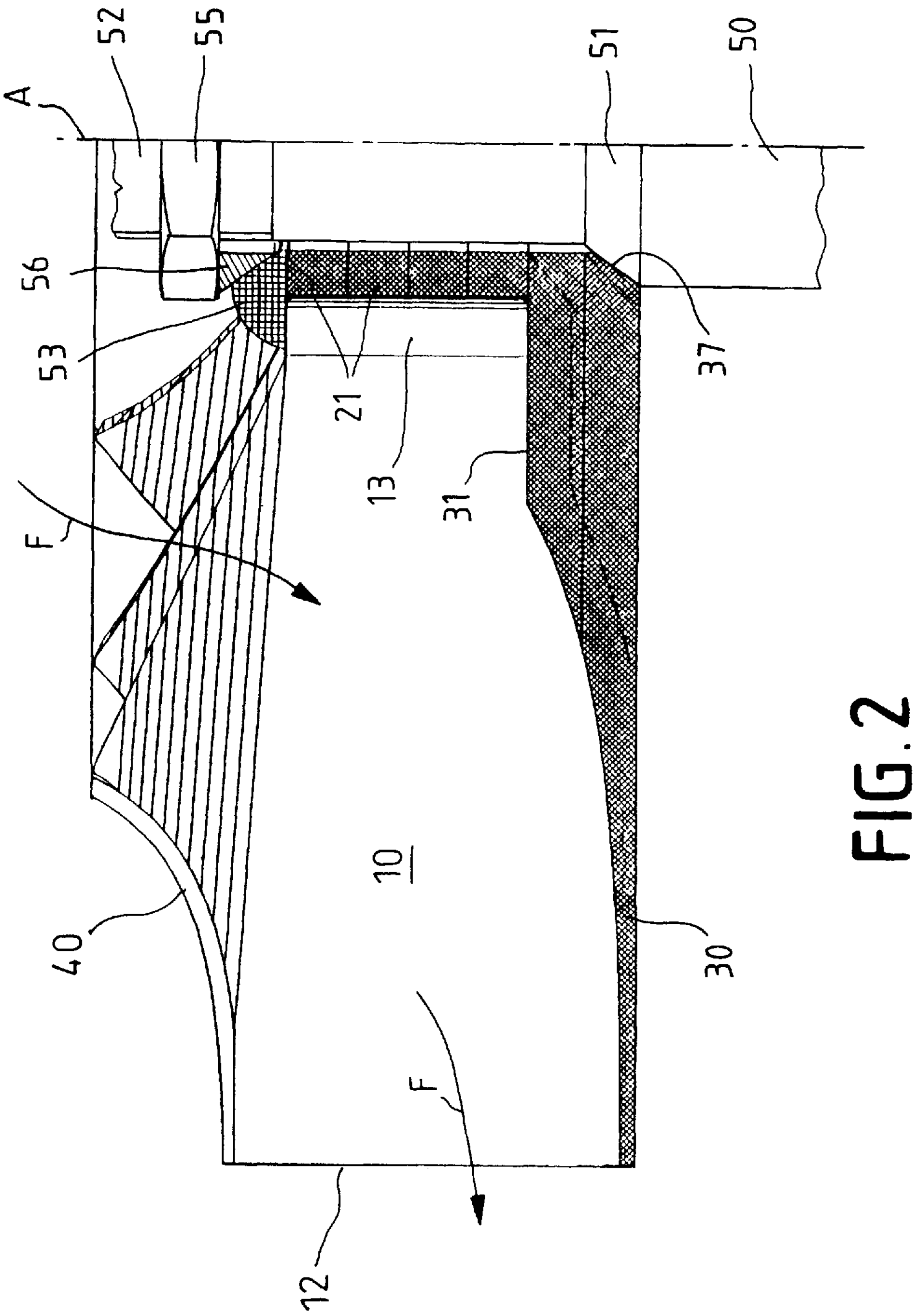
FIG. 2 is a fragmentary section view of the FIG. 1 turbine.

FIGS. 1 and 2 show a turbine comprising a plurality of blades 10 regularly distributed around a hub 20 between two end plates 30 and 40. These various component parts of the turbine are made of a thermo-structural composite material, e.g. a carbon-carbon (C—C) composite material or a ceramic matrix composite material such as a C-SiC (carbon fiber reinforcement and silicon carbide matrix) composite material.

Between them, the blades 10 define passages 11 for fluid flow. At one axial end of the turbine, the passages 11 are closed by the end plate 30 which is annular in shape and extends from the hub 20 to the free outside edges 12 of the blades 10. At the other axial end, the end plate 40 which is substantially annular in shape, extends over a portion only of the length of the blades 10, inwards from the outside edges 12 thereof.

The empty space between the inside edge 41 of the end plate 40 and the hub 20 defines an inlet zone from which fluid can be sucked through the passages 11 to be ejected through the outer ring of the turbine, as represented by arrows F in FIG. 2.

There follows a description of how the various component parts of the turbine are made and then assembled together.

The hub 20 is built up from annular plates 21 which are stacked along the axis A of the turbine. The plates 21 have the same inside diameter defining the central passage of the hub. In each plate, the outside diameter increases progressively from its face closer to the fluid inlet zone towards its opposite face, with the contacting faces of two adjacent plates having the same outside diameter, such that the set of plates 21 forms a hub of regularly increasing thickness between the end plate 40 and the end plate 30, but without discontinuity. Dovetail-shaped grooves 23 are formed in the periphery of the hub 20 to receive the roots of the blades 10 and to connect them to the hub as described in greater detail below. The grooves 23 extend axially over the entire length of the hub 20 and they are regularly distributed thereabout. In the plates 21 of larger outside diameter, the grooves 23 communicate with the outside via slots 23*a* of width corresponding substantially to the thickness of a blade.

Each annular plate 21 is made individually out of thermostructural composite material. To this end, it is possible to use a fiber structure in the form of a plate from which an annular preform is cut out. Such a structure is fabricated, for example, by stacking flat plies of two-dimensional fiber fabric, such as a sheet of threads or cables, woven cloth, etc., and linking the plies together by needling, e.g. as described in document FR-A-2 584 106.

The annular preform cut out from said plate is densified by the material constituting the matrix of the thermostructural composite material that is to be made. Densification is performed in a conventional manner by chemical vapor infiltration or by means of a liquid, i.e. by being impregnated with a liquid precursor for the matrix and then transforming the precursor. After densification, the annular plate is machined so as to brought to its final dimensions and to form the notches which, after the plates have been stacked, constitute the grooves 23 and the slots 23*a*.

The plates 21 are constrained to rotate together about the axis A of the turbine by means of screws 26 which extend axially through all of the plates. The screws 26 are machined from blocks of thermostructural composite material.

The end plate 30 which closes the passages 11 on their sides remote from the fluid inlet zone is made of thermo-structural composite material by densifying a fiber preform. The preform is fabricated, for example, by stacking flat two-dimensional plies and linking the plies together by needling.

In the example shown, the thickness of the end plate 30 increases continuously from its periphery to its inside circumference. An intermediate annular plate 31 may be interposed between the hub 20 proper and the end plate 30 proper, said plate 31 having an outside profile such as to enable the face of the plate 30 that faces towards the inside of the turbine to run without discontinuity into the outside surface of the hub 10. The plate 31 is constrained to rotate with the plates 21 by means of the screws 26 of thermo-structural composite material. It will be observed that the profile of the end plate 30 could be obtained from a preform made by stacking annular plies of progressively decreasing outside diameter.

After it has been densified, the end plate is machined to its final dimensions. In particular, the inner annular face 37 of the end plate 30 is frustoconical in shape to enable the turbine to be mounted on a shaft. The end plate 30 is constrained to rotate with the hub 20 about the axis A by means of screws 36 of thermostructural composite material connecting the end plate 30 to the plate 31.

Figure 3:
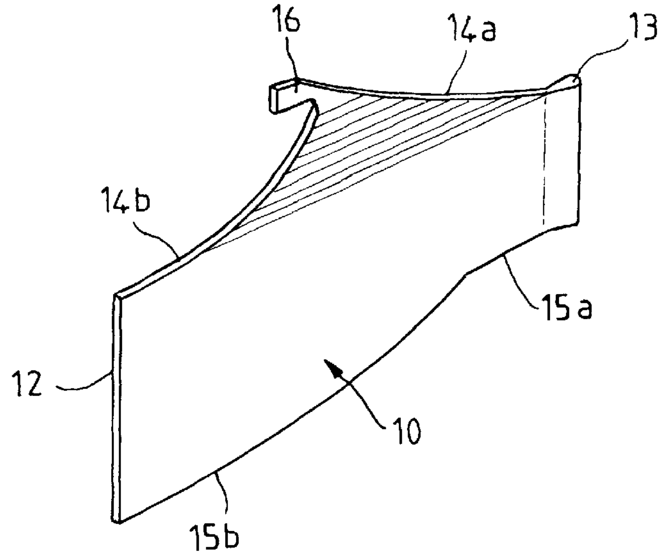
FIG. 3 is a highly diagrammatic view of one blade of the FIG. 1 turbine.

Each blade 10 is in the form of a thin plate of curved surface whose outline is shown highly diagrammatically in FIG. 3. The inside end of each blade 10 for connection to the hub 20 has an enlarged portion forming a blade root 13 of shape and dimensions that correspond to those of the grooves 23 in the hub. The edge of each blade 10 situated adjacent to the fluid inlet zone presents, starting from the root 13, a first concave curved portion 14*a* which terminates in a lug-forming radial projection 16. The lug is connected to the end edge 12 by a second concave portion 14*b*. The edge of the blade remote from the fluid inlet zone presents, starting from the root 13, a radial portion 15*a* extended by a convex portion 15*b* which follows the profile of the adjacent faces of the intermediate plate 31 and of the end plate 30.

Figure 4:
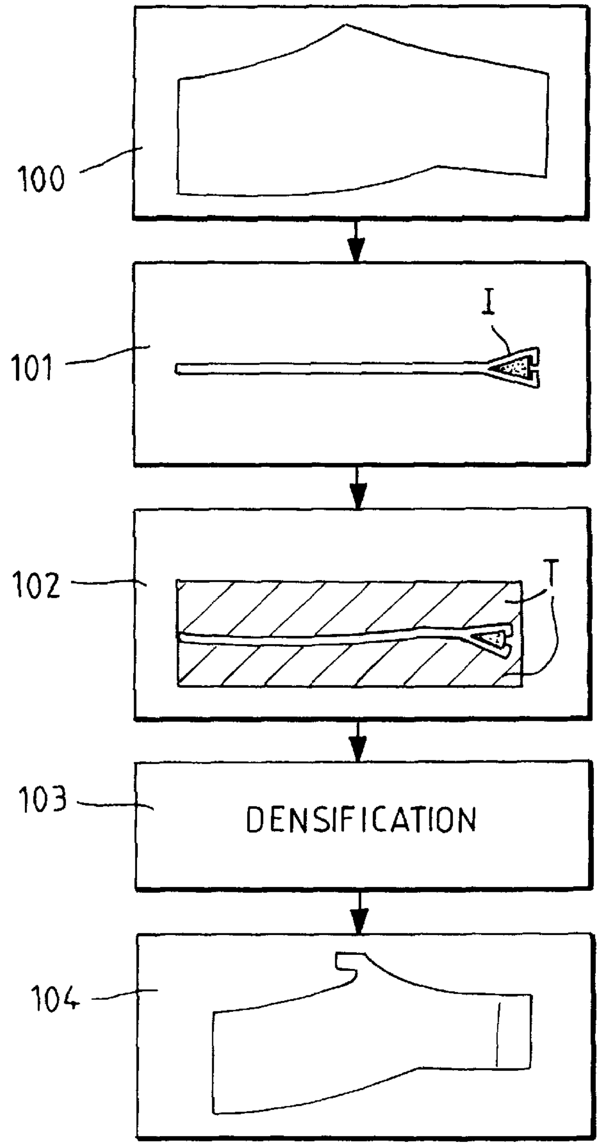
FIG. 4 shows the successive steps in making the FIG. 3 blade.

Successive steps for making the blade 10 out of thermo-structural composite material are shown in FIG. 4.

The starting material is a deformable fiber structure in the form of a sheet or plate having thickness that corresponds to the thickness of the blade and that is built up, for example, by superposing and needling two-dimensional fiber plies as described in document FR-A-2 584 106 or document FR-A-2 686 907.

The fiber structure is cut to approximately the outline of the blade (step 100), and then the edge corresponding to the location of the root is split so as to receive an insert I around which the portions of the fiber structure situated on either side of the slit are folded down (step 101). The fiber structure is then preimpregnated with a resin and is shaped in tooling T in order to give it a shape close to that of the blade that is to be made (step 102). After the resin has cured in the tooling, a preform P of the blade is obtained. The resin is then pyrolyzed leaving a residue, e.g. of carbon, that holds the fibers together sufficiently to ensure that the preform P retains its shape. Densification can then be continued outside the tooling either by continuing the liquid method or else by chemical vapor infiltration (step 103).

After densification, the outline of the blade is machined accurately, in particular for the purpose of forming the lug 16 and the edges 12, 14, and 15 (step 104).

The annular end plate 40 has a curved profile corresponding to the profile of edge portion 14*b* of the blades. The end plate is made by densifying a fiber fabric in the form of a sheet or a plate, in the same manner as the blades 10. After densification, the end plate 40 is machined to be brought to its final dimensions and to form notches 46 for receiving the lugs 16 of the blades 10.

The turbine is assembled as follows.

The blades 10 are hooked to the end plate 40 by engaging the lugs 16 in the notches 46. Thereafter, the hub 20 is built up by stacking the plates 21 one after another while simultaneously inserting the roots 13 of the blades in the grooves 23. The plate 31 is put into place and then the plates 21 are connected together and to the plate 31 by means of the screws 26. The end plate 30 is then put into place, as are the screws 36. It will be observed that respective channels 44 and 35 may be formed on the inside faces of the end plates 40 and 30 into which the respective edges 24*b* and 25*b* of the blades can be inserted in order to hold the blades more effectively.

The various parts of the turbine are held together in the assembled state by being mounted on a shaft 50 (shown in FIG. 2 only). The shaft has a frustoconical shoulder 51 which bears against the corresponding frustoconical inner annular surface 37 of the end plate 30, the shaft continues through the hub 20 and has a threaded portion 52 projecting beyond the end thereof.

A washer 53 is placed on the plate 21 at the end of the hub remote from the end plate 30, with the diameter of the washer 53 being sufficient to close the grooves 23. The plates 21, 31 and the end plate 30 are clamped together by a nut 55 engaged on the threaded portion 52 and exerting force on the washer 53 via another washer 56, the washers 53 and 56 bearing against each other via frustoconical surfaces.

The end plate 40 is held solely by hooking engagement with the lugs 16 of the blades.

In a variant, the end plate 40 could be fixed to the blades by adhesive, with or without the mechanical engagement of blade lugs in end plate notches. After using adhesive, it may be advantageous to perform a chemical vapor infiltration cycle in order to densify the adhesive join and to establish matrix continuity at the interfaces between the parts that have been stuck together.

In another variant, and insofar as the blades are held adequately by being mounted on the hub and inserted in the channels of the end plate 30, the end plate 40 could be constituted by a static part, i.e. a part that is not constrained to rotate with the remainder of the turbine.

A turbine as shown in FIGS. 1 and 2 has been made out of C—C composite with a diameter of 950 mm and an axial width of 250 mm. It has been used for sucking in gas at a temperature of 1200° C., with a speed of rotation of 3000 rpm providing a flow rate of 130,000 $m^3$/h.

Compared with a metal turbine of the same dimensions, the mass saving is in a ratio of about 5 to 1, i.e. the C—C composite turbine weighed about 40 kg compared with 200 kg for the metal turbine. The mass of the metal turbine meant that its speed of rotation could not exceed about 800 rpm, in practice.

We claim:

1. A method of manufacturing a turbine comprising a plurality of blades disposed around a hub and between two end plates, the blades, the hub, and the end plates being made of thermostructural composite material, wherein the method comprises the steps of:

a) making the hub by stacking plane annular plates of thermostructural composite material along a common axis, and fastening the plates so that they are constrained to rotate together about the axis;

b) making each blade by implementing the following steps:

shaping an essentially two-dimensional fiber fabric in plate or sheet form to obtain a blade preform;

densifying the preform with a matrix to obtain a blade blank made of thermostructural composite material; and machining the outline of the densified preform;

c) making each end plate by implementing the following steps:

making an annular or substantially annular preform by means of an essentially two-dimensional fiber fabric in plate or sheet form; and densifying the preform with a matrix to obtain a part made of thermostructural composite material; and d) assembling the blades to the hub between the end plates, each blade being connected to the hub by an inside edge portion inserted in a groove formed in the hub.

2. A method according to claim 1, wherein the method further comprises the steps of:

making each blade with said inside edge portion constituting a blade root with a swelled form; and connecting each blade to the hub by inserting the blade root in a groove of complementary shape formed in the hub.

3. A method according to claim 1, wherein the method further comprises the step of making the preform of each blade by shaping a preimpregnated fiber fabric.

4. A method according to claim 1, wherein the method further comprises the step of forming a blade root by placing an insert in a slit formed in the fiber fabric used for making the preform of a blade.

5. A method according to claim 1, wherein the method further comprises the step of assembling the plates constituting the hub together with at least one annular plate constituting a first end plate closing the passages between the blades at one end of the turbine, to which end plate the blades are connected by axial clamping on a shaft on which the turbine is mounted.

6. A method according to claim 5, wherein the method further comprises the step of mounting the second end plate which co-operates with the hub to leave an annular fluid inlet zone for suction through the passages between the blades, on the blades.

7. A method according to claim 6, wherein the method further comprises the step of forming notches in the second end plate in which lugs formed on the adjacent edges of the blades are engaged.

8. A method according to claim 6, wherein the method further comprises the step of adhering the second end plate to the adjacent edges of the blades.

* * * * *